United States Patent
Hendriks et al.

(10) Patent No.: US 9,453,997 B2
(45) Date of Patent: Sep. 27, 2016

(54) ELECTROWETTING DISPLAY DEVICE

(71) Applicant: Liquavista B.V., Eindhoven (NL)

(72) Inventors: Christian Etienne Hendriks, Eindhoven (NL); Jeroen Cornelis van der Gaag, Mierlo (NL)

(73) Assignee: Amazon Technologies, Inc., Seattle, WA (US)

( * ) Notice: Subject to any disclaimer, the term of this patent is extended or adjusted under 35 U.S.C. 154(b) by 6 days.

(21) Appl. No.: 14/293,378

(22) Filed: Jun. 2, 2014

(65) Prior Publication Data

US 2014/0268298 A1    Sep. 18, 2014

Related U.S. Application Data

(63) Continuation of application No. PCT/EP2012/074176, filed on Nov. 30, 2012.

(30) Foreign Application Priority Data

Dec. 2, 2011 (GB) .................................. 1120777.6

(51) Int. Cl.
  *G02B 26/00* (2006.01)
  *G09G 3/34* (2006.01)

(52) U.S. Cl.
  CPC ............ *G02B 26/005* (2013.01); *G09G 3/348* (2013.01); *G02B 2207/115* (2013.01); *Y10T 428/24479* (2015.01)

(58) Field of Classification Search
  CPC .............. G02B 26/005; G02B 26/004; G02B 2207/115
  USPC .................................................. 359/290–297
  See application file for complete search history.

(56) References Cited

U.S. PATENT DOCUMENTS

| | | | |
|---|---|---|---|
| 6,734,942 B2 | 5/2004 | Takeuchi | |
| 6,870,591 B2 | 3/2005 | Lee et al. | |
| 2006/0285067 A1 | 12/2006 | Kim | |
| 2007/0019006 A1* | 1/2007 | Marcu | G02B 26/005 345/690 |
| 2007/0223079 A1* | 9/2007 | Honeyman et al. | 359/296 |
| 2009/0109520 A1* | 4/2009 | Park | G02F 1/167 359/296 |
| 2010/0296150 A1* | 11/2010 | Hayes et al. | 359/290 |
| 2011/0140996 A1* | 6/2011 | Parry-Jones | G02B 26/005 345/60 |
| 2012/0243071 A1* | 9/2012 | Lee | G02B 26/005 359/290 |
| 2013/0057941 A1* | 3/2013 | Massard | G02B 26/005 359/290 |

FOREIGN PATENT DOCUMENTS

| | | |
|---|---|---|
| CN | 101868749 A | 10/2010 |
| WO | 03071346 A1 | 8/2003 |
| WO | 2005073761 A1 | 8/2005 |
| WO | 2006017129 A2 | 2/2006 |
| WO | 2009065909 A1 | 5/2009 |
| WO | 2009071694 A2 | 6/2009 |

* cited by examiner

*Primary Examiner* — Mahidere Sahle
(74) *Attorney, Agent, or Firm* — EIP US LLP

(57) ABSTRACT

An electrowetting display device with first and second support plates and a seal arranged to bond the first and second support plates together. The second support plate is arranged to at least partly constrain outward movement of the seal.

23 Claims, 10 Drawing Sheets

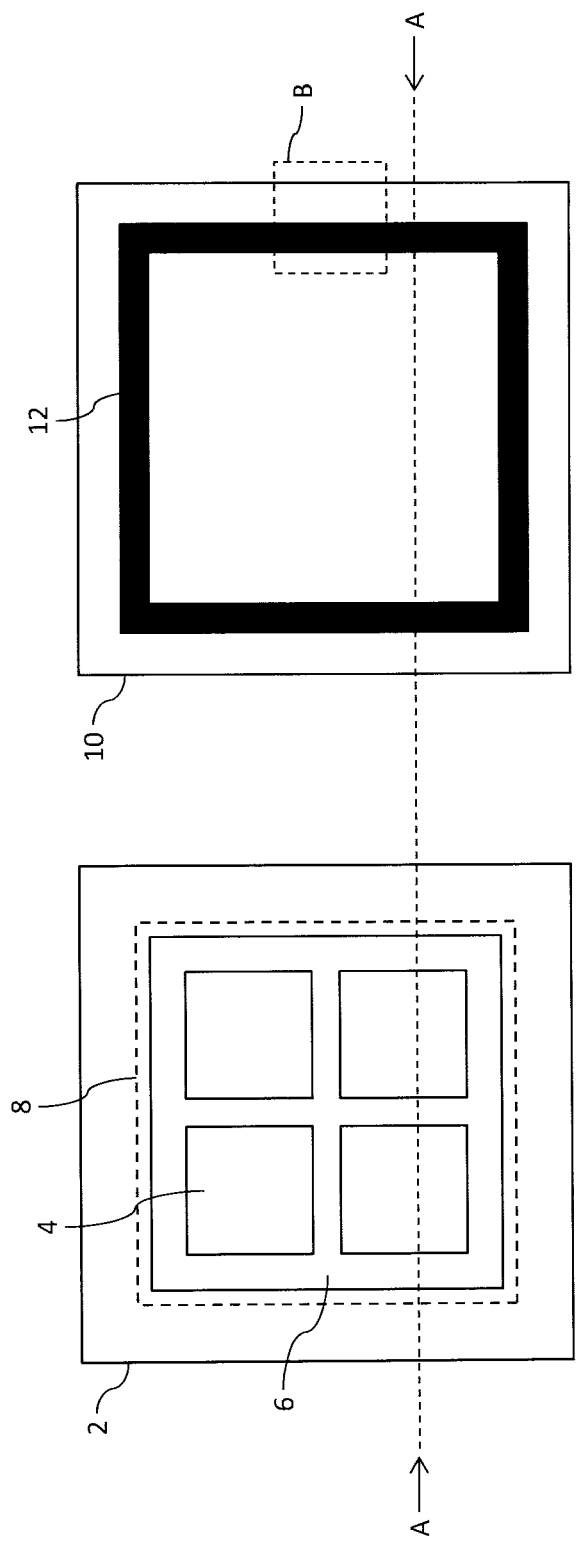

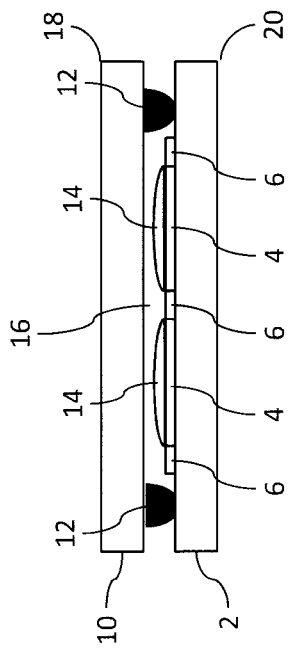
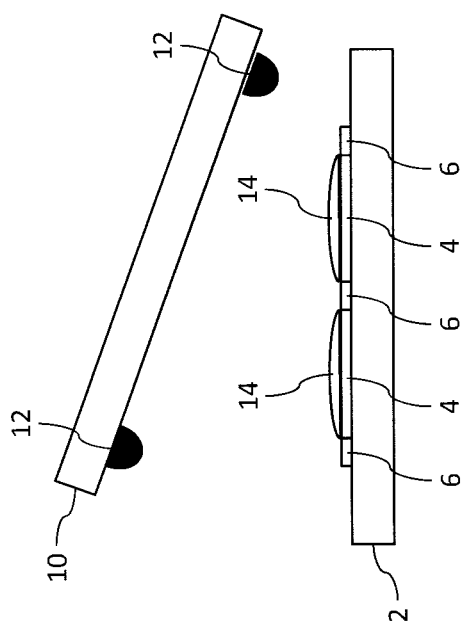
*Fig 2B*
*Fig 2A*

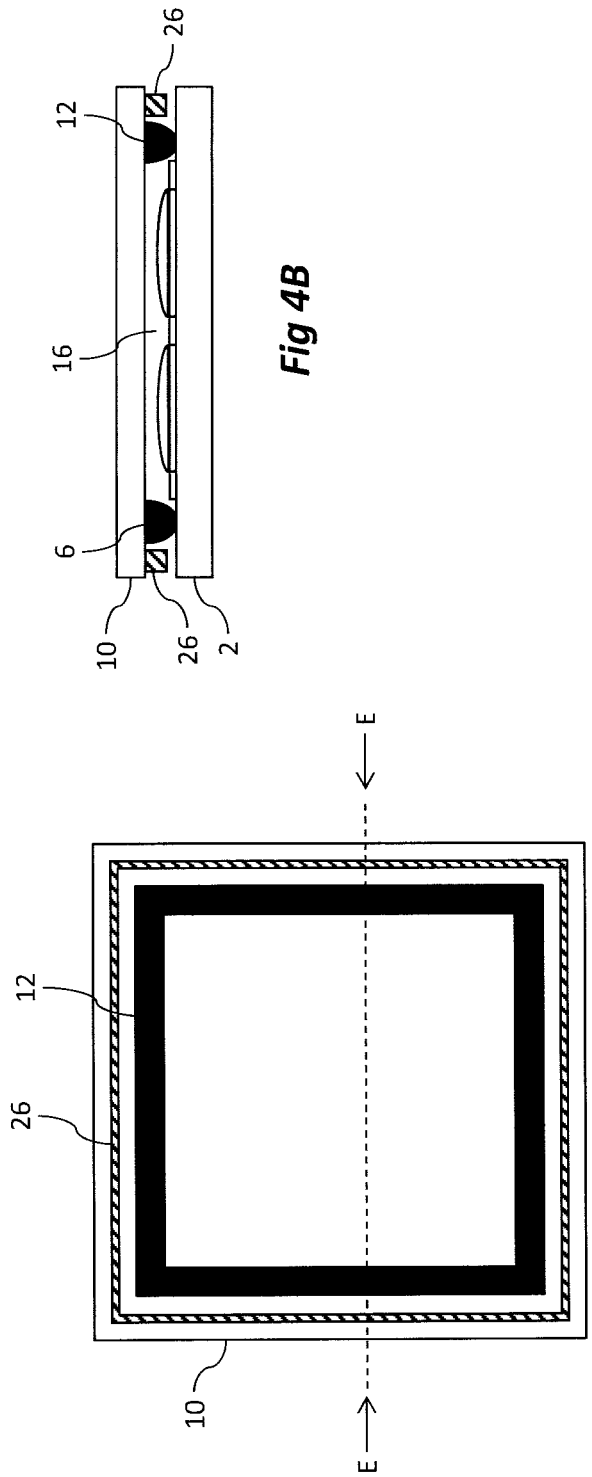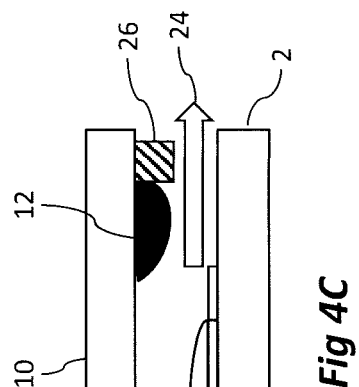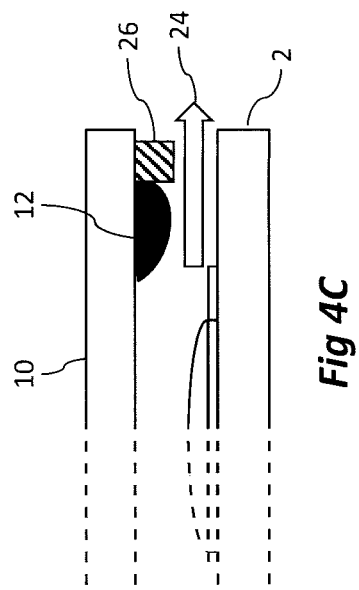

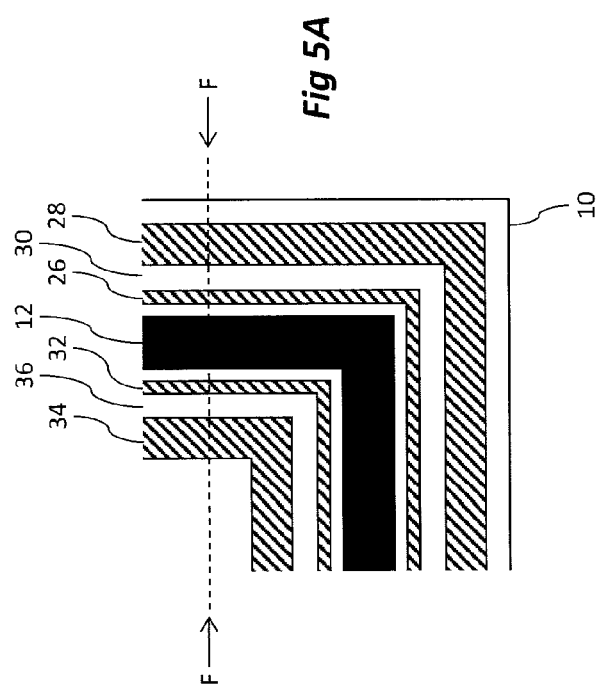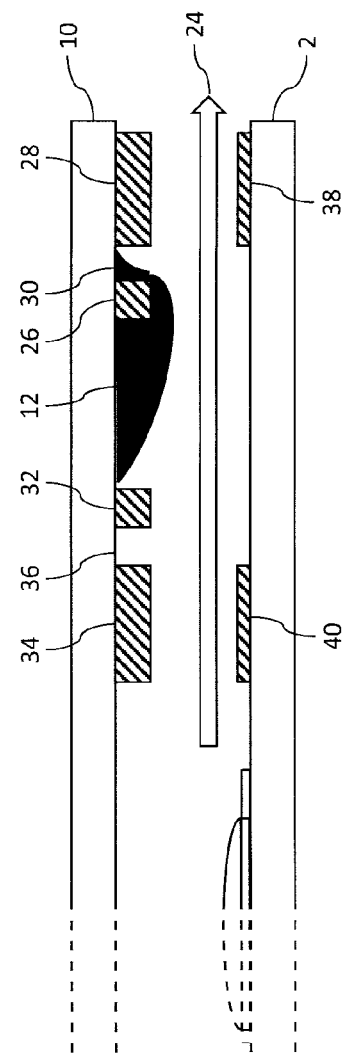

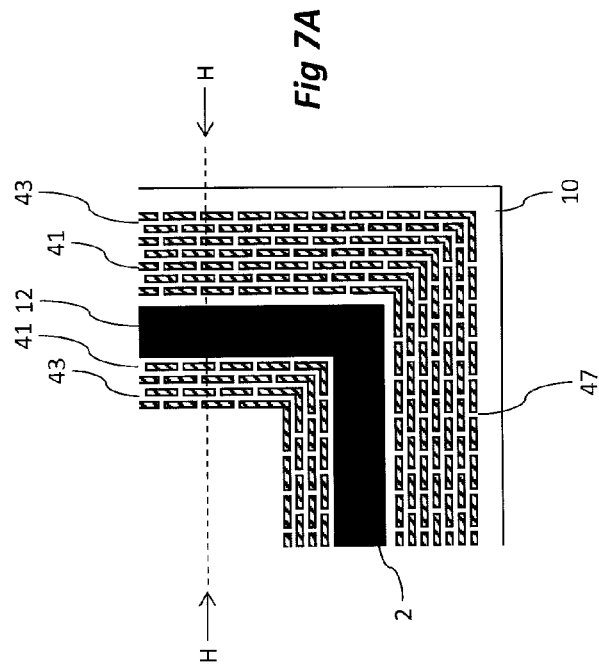
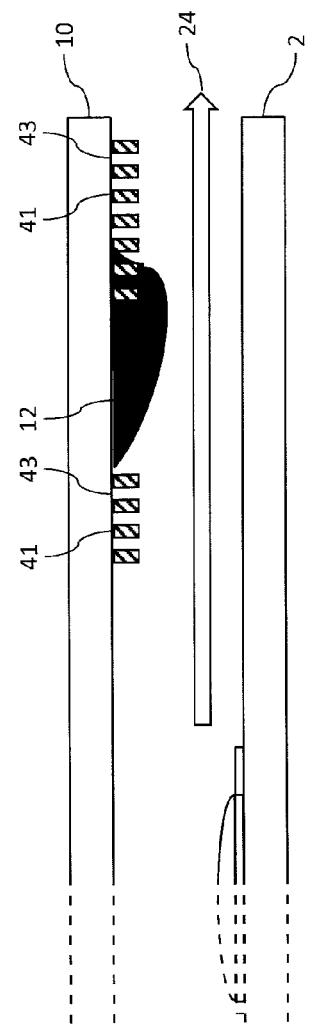
Fig 7A
Fig 7B

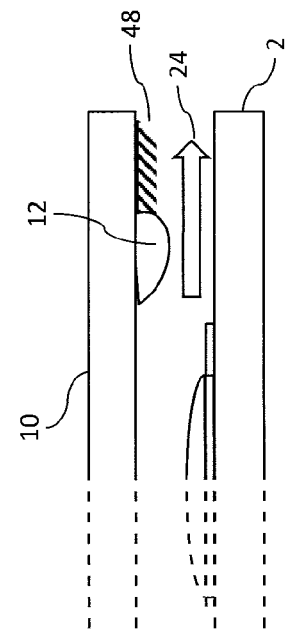
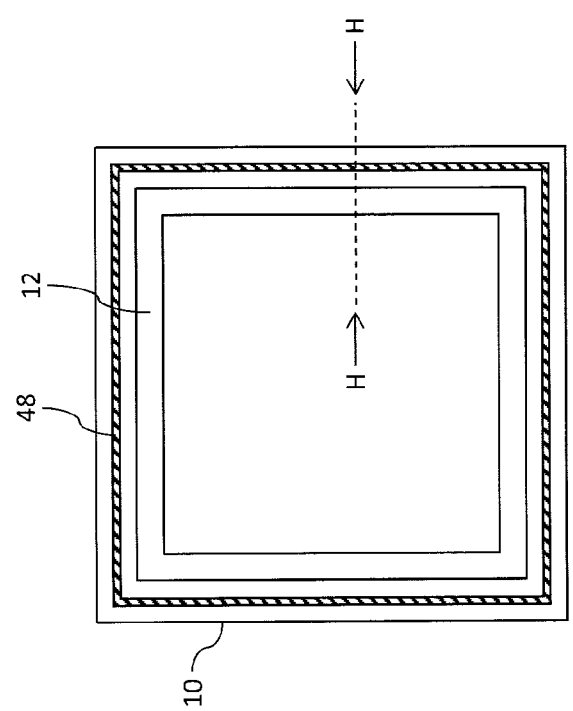
Fig 9B
Fig 9A

ELECTROWETTING DISPLAY DEVICE

CROSS REFERENCE TO RELATED APPLICATIONS

This application is a continuation under 35 U.S.C. §120 of PCT Application No. PCT/EP2012/074176 filed Nov. 30, 2012.

BACKGROUND

A typical electrowetting display device comprises first and second support plates held together by a seal. The seal and the support plates define a sealed chamber containing a display region provided by first and second immiscible fluids. As such, the seal forms a perimeter to the chamber, and is typically formed of an adhesive material.

During a typical manufacturing process, first immiscible fluid is provided in the display region of the first support plate, and a liquid adhesive is provided on the second support plate so as to define the boundary of the chamber. Subsequently, the first and second support plates are immersed in a bath of the second immiscible fluid and brought together such that the first support plate contacts the adhesive on the second support plate. The adhesive is then cured (using e.g. UV radiation) to both mechanically attach the support plates together as well as sealing the chamber containing the fluids.

It is desirable to provide an improved electrowetting display device.

BRIEF DESCRIPTION OF DRAWINGS

FIG. 1A shows a top view of a first support plate 2;
FIG. 1B shows a top view of a second support plate 10;
FIG. 2A shows a cross-section of the support plates 2 and 10 before assembly;
FIG. 2B shows a cross-section of the support plates 2 and 10 after assembly;
FIG. 4A shows a top view of a second support plate 10 according to an embodiment;
FIG. 4B shows a cross-section of the support plates 2 and 10 after assembly according to an embodiment;
FIG. 4C shows a cross-section of the support plates 2 and 10 during assembly according to an embodiment;
FIG. 5A shows a top view of part of a second support plate 10 according to an embodiment;
FIG. 5B shows a cross-section of the support plates 2 and 10 during assembly according to an embodiment;
FIG. 7A shows a top view of part of a second support plate 10 according to an embodiment;
FIG. 7B shows a cross-section of the support plates 2 and 10 during assembly according to an embodiment;
FIG. 9A shows a top view of part of a second support plate 10 according to an embodiment;
FIG. 9B shows a cross-section of the support plates 2 and 10 during assembly according to an embodiment.

Figure 3A:
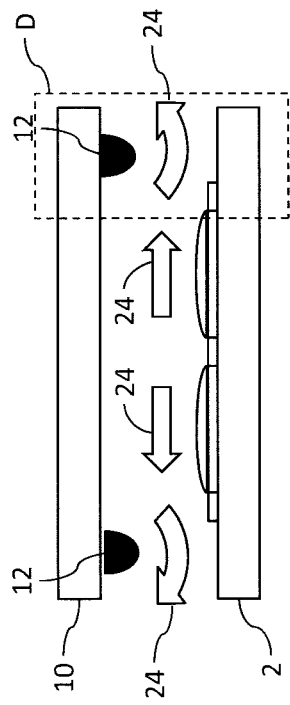
FIG. 3A shows a plan view of a portion of a seal in an assembled display device.

A number of embodiments are illustrated in the above mentioned Figures. Where a given feature is the same, or similar, between embodiments, it is referred to below with the same reference numeral; corresponding descriptions should be taken to apply also, and differences between such features in different embodiments will be described where appropriate. It will further be understood that the drawings are schematic, and are exaggerated in some dimensions for sake of clarity.

DETAILED DESCRIPTION

The entire contents of the following patent documents are incorporated by reference herein:
1. GB 1120777.6 filed Dec. 2, 2011
2. PCT/EP2012/074176 filed Nov. 30, 2012

Embodiments described herein relate to an electrowetting display device, and in particular to the sealing of support plates in an electrowetting display device.

Embodiments will firstly be described in summary form. In accordance with first embodiments, there is provided an electrowetting display device comprising: a first support plate; a second support plate; and a seal arranged to bond the first and second support plates together, thereby defining a perimeter of a sealed chamber between the first and second support plates, the sealed chamber comprising a first and a second fluid immiscible with each other, wherein the second support plate is arranged to at least partly constrain outward movement of the seal.

It is known that, during manufacture of the electrowetting display, first and second support plates are brought together while immersed in a fluid. This ensures that a chamber between the plates can be filled with the fluid. An uncured seal material is applied on the first plate, for bonding the plates together once they have been brought together.

The inventors of the embodiments described herein have identified a new unknown problem. The inventors have found that despite the seal, fluid may leak from the chamber, via the seal.

In light of the new problem, the inventors have identified that this leakage is caused by the method of manufacture. In particular, in the known method, as the distance between the support plates reduces as the plates are brought together (reducing the volume between the plates), a significant amount of fluid is squeezed out of the reducing volume. The fluid being squeezed out flows over the uncured seal material and can undesirably move the position of the seal material in the direction of the fluid flow. In some cases this can spread the seal material over a greater than desired area of the second support plate; the seal material might even in places be pushed beyond an edge of the second support plate. Consequently, the resultant seal between the first and second support plates may not form a suitable seal for the chamber. The seal may be incomplete, for example having a channel in the seal or having been spread too thinly in places such that it does not uniformly contact both support plates. Fluid in the chamber may therefore leak through the seal.

The insight of the inventors in devising the embodiments described herein is to arrange the second support plate to at least partly constrain outward movement of the seal. In other words, the second support plate is arranged to at least partly restrict or limit outward movement of the seal. In this way, in the example of manufacturing an electrowetting display device, any movement of the uncured seal material outwards is reduced if not prevented, thus resulting in an improved seal. Moreover, after manufacture, any outward movement of the seal, for example caused by pressure exerted on the seal by the fluid when the first and second support plates are squeezed together, is constrained.

In an embodiment the second support plate may comprise a first protrusion surrounding the seal. The first protrusion, by surrounding the seal, has the effect of reducing the degree to which the seal is moved outwards as the plates are brought together during a manufacture process. This improves the sealing performance. As described later in the description the first protrusion could be formed either extending beyond the plane of a surface of the second support plate, or by forming at least one groove beneath the plane of the surface of the second support plate.

In an embodiment the second support plate may comprise a second protrusion, the second protrusion spaced from and surrounding the first protrusion. By having both a first and a second protrusion which are spaced from each other (e.g. they have a channel or groove between them), the seal material may flow over the first protrusion. Therefore, a build up of excess seal along the first protrusion is avoided, with the excess seal being trapped between the first and second protrusions. The second protrusion subsequently provides an additional barrier to the flow of the sealing material which is therefore prevented from being spread over the edges of the second support plate. This improves the quality of the seal.

In an embodiment the first protrusion may have a thickness in a direction parallel to the plane of the second support plate which is less than a thickness of the second protrusion in a direction parallel to the plane of the second support plate. In this arrangement the first protrusion reduces the moving of the sealing material, but still allows overflow of sealing material to overcome the first protrusion and settle between the first and second protrusions. The second protrusion then acts as a further barrier against seal movement.

In an embodiment the second protrusion may have a height in a direction perpendicular to the second support plate which defines a spacing between the first and second support plates. By providing the second protrusion with a specified height, the spacing between the plates can be accurately defined. This enables a more consistent manufacture of displays.

In an embodiment the first support plate may comprise a third protrusion arranged to abut the second protrusion. In addition, the second and third protrusions may have heights in a direction perpendicular to the second support plate and the first support plate, respectively, which together define a spacing between the first and second support plates. The first support plate may be provided with a third protrusion which abuts the second protrusion of the second support plate. The second and third protrusions may subsequently cooperate to define the spacing of the support plates.

In an embodiment the first protrusion may be spaced from the first support plate to form a gap therebetween. In embodiments where the second support plate also comprises the second protrusion, the spacing is effected by the first protrusion being of less height than the second protrusion; in other such embodiments, the first and second protrusions may be substantially the same height, but where the first support plate comprises the third protrusion, the third protrusion may cooperate with the second protrusion such that the first protrusion is spaced from the first support plate. By providing a gap between the first protrusion and the first support plate, the seal material may flow over the first protrusion and into the gap between the first protrusion and the second protrusion. Thus excess seal material can be allowed to move outwards, but in a constrained manner so it does not overflow from the display device.

In an embodiment the first protrusion may comprise at least one transverse channel crossing the protrusion in a direction parallel to the plane of the second support plate. The second protrusion may comprise at least one transverse channel offset from at least one transverse channel of the first protrusion. At least one channel may be provided through the first and may be also the second protrusion to allow for the flow of sealing material and for fluid to be expelled as the plates are brought together. In one embodiment the channels are offset from each other, that is the channel in the first protrusion is not aligned with the channel in the second protrusion so as to reduce flow through the channels.

In an embodiment, the second support plate may comprise a plurality of protrusions surrounding the seal, each said protrusion being spaced from an adjacent said protrusion. The protrusions may comprise a plurality of transverse channels, wherein at least one of the transverse channels of a first one of said protrusions is offset from at least one of the transverse channels of an adjacent one of said protrusions.

In an embodiment, the second support plate may comprise one or more further protrusions surrounded by the seal. In addition, the one or more further protrusions may comprise a fourth and a fifth protrusion. Further protrusions may be provided on the inner side of the seal. In an embodiment, the one or more further protrusions comprises a plurality of protrusions, the protrusions comprising a plurality of transverse channels, wherein at least one of the transverse channels of a first one of said protrusions is offset from at least one of the transverse channels of an adjacent one of said protrusions. These further protrusions may be similar in design to the first and second protrusions and may be used to prevent the sealing material from spreading inwards and contaminating fluids within the chamber defined by the seal or damaging other parts of the picture element. Furthermore, these protrusions may allow for a smaller spacing to be provided between the seal and the display areas of the display device.

In an embodiment, at least one of the first and second support plates may comprise a plurality of elements extending into the seal. These elements may have a high affinity for the seal material and are adhered to by the seal and thus improve both sealing performance and adhesion between the plates to provide a device with greater mechanical integrity. The elements promote even distribution of the adhesive as the plates are brought together during manufacture of the device, and may also contribute to constrain the outward movement of the seal.

In accordance with second embodiments, there is provided a support plate for an electrowetting display device, the support plate being arranged to at least partly constrain outward movement of a seal material located thereon.

In accordance with third embodiments, there is provided a method of manufacturing an electrowetting display device, the method comprising: providing a second support plate arranged to at least partly constrain outward movement of a seal material provided thereon; providing the seal material in a position on the second support plate so as to be constrained from outward movement by the second support plate; providing at least one fluid between the second support plate and a first support plate; moving the first and second support plates together such that the seal material forms a seal between the first and second support plate.

In an embodiment, the second support plate may comprise a first protrusion and the seal material is provided so as to be surrounded by the first protrusion.

Examples of embodiments will now be described in detail.

To place the embodiments into context, a known method of constructing an electrowetting display with two support plates will now be described with reference to FIGS. 1A to 2B.

The electrowetting device shown is an electrowetting display device having four picture elements. The electrowetting device comprises a first fluid and a second fluid. In this embodiment, the first and second fluids are immiscible liquids. The first fluid is electrically non-conductive and may for instance be an alkane like hexadecane or (silicone) oil. The first fluid may be opaque, but may be coloured or white. The second fluid is electrically conductive or polar, and may be water or a salt solution such as a solution of potassium chloride in a mixture of water and ethyl alcohol. The second fluid may be transparent, but may be coloured, white, absorbing or reflecting.

FIG. 1A shows the top view of the first support plate 2. The first support plate 2 comprises four first surface areas 4 that are less wettable to the second fluid and a second surface area 6 more wettable to the second fluid. The second surface area 6 encloses and divides the first surface areas 4. The four first surface areas 4 correspond to the four picture elements of the display device, wherein each area 4 is used for forming an image, and are arranged within a display region 8 (represented by a dotted line). When the first fluid is an oil and the second fluid water, the first surface areas 4 may be hydrophobic and the second surface area 6 is hydrophilic.

The wettability properties of the surface areas may be obtained by a suitable choice of material, treatment of the support plate surface or application of a layer on the support plate surface. The first surface areas 4 may be formed for instance by an amorphous fluoropolymer layer such as AF1600 or another low surface energy polymer. The hydrophobic character causes the first fluid to adhere preferentially to the first surface areas 4 since the hydrophobic layer has a higher wettability with respect to the first fluid than it has with respect to the second fluid. The second surface area 6 may be formed by a photoresist layer, for instance SU-8.

Wettability relates to the relative affinity of a fluid for the surface of a solid. Wettability increases with increasing affinity, and it can be measured by the contact angle formed between the fluid and the solid and measured internal to the fluid of interest. This increases from relative non-wettability at an angle more than 90° to complete wettability when the contact angle is 0°, in which case the fluid tends to form a film on the surface of the solid.

FIG. 1B shows a top view of the second support plate 10. A sealing material is arranged on the second support plate 10 in a pre-determined pattern, in this embodiment a square 12 having a shape corresponding to the boundary of the display region 8 such that when the seal bonds the first and second support plates together, the display region 8 is enclosed within the seal. The sealing material may be dispensed using an injector that is made to follow the pre-determined pattern. To avoid a non-uniform thickness of material in the pattern due to the start of the injection, the injection may be started outside the display region and then continued towards the pre-determined pattern.

FIG. 2A shows a cross-section of the first and second support plates 2 and 10 before assembly of the electrowetting display device. The cross-section is taken along the line A-A in FIGS. 1A and 1B. FIG. 2A shows the sealing material 12 also in cross-section.

The first support plate has been provided with first fluid 14, adjoining only the first surface areas 4. A method of applying the first fluid 14 on the first surface areas 4 is to submerge the first support plate 2 in a bath of the second fluid, e.g. water. The first fluid 14, e.g. oil, is then dispensed on the surface of the first support plate 2 by a dispenser having an elongate opening located close to the surface of the first support plate 2 and also submerged in the second fluid. The dispenser is moved over the surface of the first support plate 2 in a direction perpendicular to the long direction of the opening. The first fluid 14 is dispensed over the length of the dispenser as a thin film of first fluid 14. Since the surface of the first support plate 2 comprises first surface areas 4 that are more wettable with respect to the first fluid 14 than to the second fluid and a second surface area 6 that is more wettable to the second fluid, the first fluid 14 will preferentially wet the first surface areas 4 and will not cover the second surface areas 6.

Having used the above method of applying the first fluid 14, the subsequent step of joining the two support plates is also carried out in the bath of the second fluid. Thus the second support plate 10 is put into the bath, where care is taken that no air is trapped under the support plate.

The two support plates 2 and 10 are aligned and pressed together such that the two support plates obtain the desired mutual distance as shown in FIG. 2B. The seal material forms a seal 12 between the two support plates. The two support plates and the seal therefore enclose a chamber 16 between the two support plates, with the seal forming a perimeter of the chamber 16. The chamber comprises the first fluid 14 adjoining the first surface areas 4 and the second fluid trapped in the chamber 16.

The surface area of the second support plate 10 on which the seal 12 is formed, and the surface area of the first support plate which the seal contacts may both be hydrophilic areas. Since no first fluid adjoins these areas, the chamber-side of the seal is adjoined only by the second fluid. The choice of sealing material can therefore be optimised for one fluid. By contrast, if the seal was formed on one of the first areas 4, the first fluid would adjoin the lower part of the seal and the second fluid the upper part of the seal.

The sealing material 12 may be a pressure-sensitive adhesive (PSA), as available e.g. from 3M. The material adheres to the support plates under the application of pressure. The sealing material may be cured by applying UV light. The thickness of the sealing material may be between 10 and 200 μm, or may exceed this range depending upon the desired separation between the first and second support plates.

A substrate of each of the support plates may be made for instance of glass or polymer and may be rigid or flexible. The display device shown in FIG. 2B has a viewing side 18 on which an image or display formed by the display device can be viewed and a rear side 20. The first support plate 2 faces the rear side 20; the second support plate 10 faces the viewing side 18. In an alternative embodiment the display may be viewed from the rear side 20. The display device may be of the reflective, transmissive or transflective type.

The position of the first fluid 14 on the first surface area 4 can be controlled by an electric field applied through electrodes, which are not shown in the Figures. Details of the electrodes and the operation of the device are described in international PCT patent publication number WO03/071346.

The inventors have identified a problem with the above-described process. This problem will now be described with reference to FIGS. 3A to 3D. FIG. 3A shows a magnified view of a portion of the seal in an assembled electrowetting display device, the portion corresponding to the area shown as dotted box B in FIG. 1B.

In FIG. 3A, the sealing material is represented by darkened area 12. The chamber 16 is shown along with the display region 8. As can be seen in FIG. 3A, the seal has not formed evenly, and has a significantly varying width (in the direction parallel to the line C-C) over the portion shown. In particular, it can be noted that in the portion denoted by reference 12', the seal is not complete around the chamber 16. This incompleteness of the seal means that the fluids may escape from the chamber and the display device may cease to operate correctly.

Figure 3B:
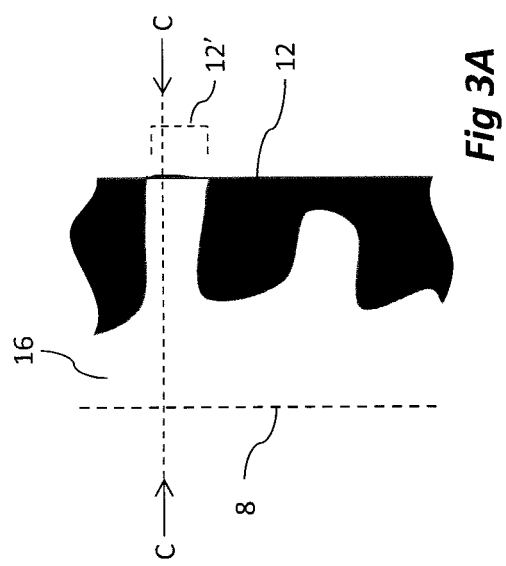
FIG. 3B shows a cross section of the support plates 2 and 10 during assembly.

The inventors have identified the cause of this problem with the seal, which will now be described with reference to FIGS. 3B to 3D. FIG. 3B shows an overview cross-section view similar to the view shown in FIGS. 2A and 2B. For clarity only the first support plate 2, second support plate 10 and seal 12 are provided with reference numerals; however the other features, such as the display areas, are present. The arrows 24 show the lateral movement of the second fluid (in which the support plates 2 and 10 are submerged) as the support plates are brought together. As shown, the second fluid is forced out from between the plates as the volume between the plates decreases. The fluid flows over the seal as shown and out from the chamber between the support plates 2 and 10.

Figure 3C:
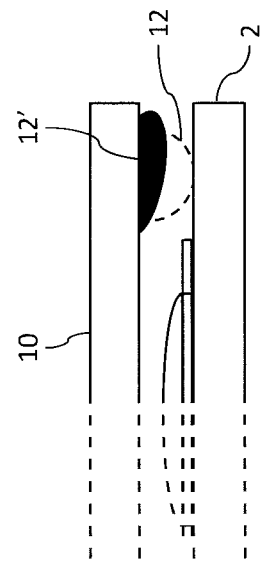
FIG. 3C shows a magnified cross-section of the seal during assembly.
Figure 3D:
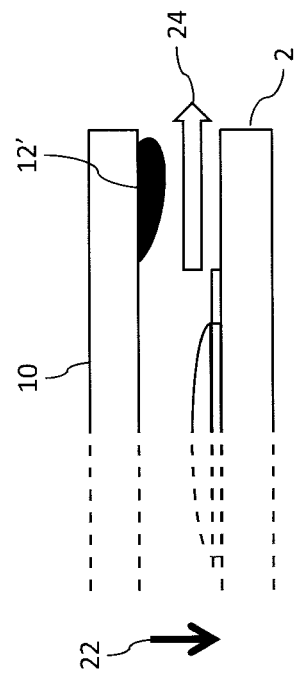
FIG. 3D shows a magnified cross-section of the seal after assembly.

FIGS. 3C and 3D show a magnified view of the dashed area D represented in FIG. 3B (i.e. a magnified cross-section of the seal). These cross-sections are taken across the line C-C in FIG. 3A.

In FIG. 3C, the first support plate 2 and second support plate 10 are spaced from each other. The sealing material 12' is formed on the surface of support plate 10. As described above, the second support plate 10 is lowered into position over the first support plate 2 while the support plates are submerged in the second fluid. The lowering is represented by black arrow 22. As the support plates are brought together, the second fluid, trapped in the volume between the support plates, is forced out around the edges of the support plate, i.e. over the seal 12'. This movement of the second fluid is represented by arrow 24. As can be seen, the shape of the seal 12' has flattened and spread in the direction of the flow, i.e. in an outward direction.

FIG. 3D shows the seal once the second support plate 10 is correctly positioned with respect to the first support plate 2. This may be before or after the seal is cured. As can be seen, along the cross-section represented by FIG. 3D, the seal does not make contact with the first support plate 2, and therefore does not form a complete seal. For comparison purposes, dashed line 12 represents the seal in an alternative cross-section, i.e. one in which the seal contacts both the first and second support plates.

Embodiments provide a solution to the problem identified above. A first embodiment will now be described with reference to FIGS. 4A to 4C.

FIG. 4A shows a top view of the second support plate 10, in a similar fashion to FIG. 1B. The second support plate 10 has the seal 12 formed thereon (shown as shaded region 12). However, in addition the second support plate 10 is arranged to at least partly constrain outward movement of the seal, in this embodiment by providing a protrusion 26 surrounding the seal 12 (shown as hatched area 26).

FIG. 4B shows a cross-sectional view of the first and second support plates (similar to those described above with reference to FIG. 2B) including the protrusion 26. Therefore, as described above with reference to FIG. 2B, the seal is formed on the second support plate 10, and contacts the first support plate to surround the display area, and seal the chamber 16. The protrusion 26, in turn, surrounds the seal and constrains the outward movement thereof.

FIG. 4C is analogous to FIG. 3C, however, it demonstrates the effect of keeping the seal in place. In particular, the second fluid is shown flowing outwards in the direction of arrow 24. This flow of the second fluid spreads the seal outwards towards the perimeter of the second support plate. However, the protrusion 26, positioned outside the seal 12, reduces this spreading of the sealing material, and therefore prevents the spreading of the seal so that it may contact the first support plate 2 when the plates are brought together and therefore make an effective seal.

Therefore, the quality of the seal is improved, in particular by reducing the instances of an incomplete seal being produced between the first and second support plates.

Further embodiments will now be described with reference to FIGS. 5A to 8. FIGS. 5A and 5B show one embodiment in which the seal is constrained in its outward movement by multiple protrusions. FIG. 5A shows a close up of a corner of a second support plate 10 according to this further embodiment. As with FIG. 4A, the second support plate 10 is provided with seal 12, and a first protrusion 26 surrounding the seal. In addition, the second support plate 10 is provided with a second protrusion 28, surrounding the first protrusion 26. The second protrusion is spaced from the first protrusion and therefore a channel, i.e. a groove, 30 is present between the first protrusion 26 and the second protrusion 28.

In addition, the second support plate 10 may be provided with further protrusions on the inside of the seal. That is, the seal surrounds these further protrusions. The further protrusions, in this embodiment, have a mirrored cross-section to the first and second protrusions 26 and 28, and therefore are formed of a fourth protrusion 32 located inside the seal, and a fifth protrusion 34 provided inside the fourth protrusion 32. The fifth protrusion 34 is spaced from the fourth protrusion 32 such that a channel 36 is present between them. The protrusions 26, 28, 32 and 34 are shown with hatching, and the seal 12 is shown as a black area.

FIG. 5B shows the second support plate 10 depicted in FIG. 5A in cross section along the line F-F, along with a first support plate 2. As with FIG. 4C, FIG. 5B depicts the arrangement of the support plates as they are being brought together, and thus there is flow (depicted by arrow 24) of the second fluid from between the plates and over the seal.

The first and second protrusions 26 and 28 are on the outside of the seal 12. Between protrusions 26 and 28 is a channel 30. In addition, on the inside of the seal 12 are protrusions 32 and 34, with channel 36 present between them.

In addition, in this embodiment, the first support plate 2 may be provided with third and sixth protrusions 38 and 40, in positions arranged to abut the second and fifth protrusions 28 and 34 respectively.

As shown in FIG. 5B, the flow of fluid (depicted by arrow 24) forces the seal material 12 in an outward direction. However, the outward movement is constrained by protrusion 26. In this embodiment, the protrusion 26 is arranged (i.e. has a height and width chosen to provide the appropriate effect) so that the seal may, in part, overflow the first protrusion 26. In such a case, the seal flows into the channel 30 where it may collect. The amount of sealing material 12 which flows over the first protrusion 26 is then prevented from moving further by the second protrusion 28.

It will be apparent that, under certain circumstances, the seal may be forced inwards. This may occur if the support plates 2 and 10 are not well aligned as they are brought together (i.e. they are not parallel); or alternatively if an excess of sealing material is provided at a given point. Therefore the third and fourth protrusions 32 and 34 may provide the same constraint on the movement of the seal, but in an inward direction. The channel 36 may equally serve to collect any excess seal flowing in an inward direction.

A further benefit of the arrangement shown in FIG. 5B is that the second protrusion 28 alone, or the second and fifth protrusions 28 and 38 (if the fifth protrusion 38 is provided) may cooperate to define the spacing between the support plates 2 and 10. That is, in the assembled display device, the second protrusion 28 may either abut the first support plate 2, or abut the fifth protrusion 38 (if provided). Therefore the spacing of the support plates 2 and 10 may be defined by the height of the second protrusion 28 and, if applicable, the height of the fifth protrusion 38. In this case, the height of a protrusion is measured perpendicular to the plane of the support plates 2 and 10.

It will be understood that the exact dimensions for the protrusions may be chosen by the skilled person depending on the specifications of the electrowetting display device being assembled to optimise the constraining effect on the seal. As an example, the first protrusion 26 may have a width (that is a dimension in the plane of the second support plate 10 and perpendicularly traversing the protrusion 26) which is less than the width of the second protrusion 28. In one embodiment, the ratio of the widths of the first and second protrusion may be approximately 1:8; however, other ratios of widths, for example in the region of 1:2 to 1:20, may be used.

In addition, the spacing between the first and second protrusions (i.e. the channel) may have a width (defined as above) which is similar to the width of the first protrusion 26. In one embodiment, the ratio of the width of the first protrusion 26 and the width of the spacing is 1:2; however other ratios, for example in the region of 1:1 to 1:4, may be used.

In one embodiment, the first protrusion 26 has a width of 0.05 mm, the channel 30 has a width of 0.1 mm and the second protrusion has a width of 0.4 mm; in addition, the spacing between the first protrusion 26 and the fourth protrusion 32 (i.e. the space in which the seal is located), is 1.7 mm.

The heights of the protrusions (the height being measured in a direction perpendicular to the plane of the second support plate 10) may also be selected to optimise the constraining of the seal, i.e. so that the first protrusion only partially constrains the movement of the seal, and allows overflow into the channel 30, and so that the second protrusion constrains any further outward movement of the seal.

In one embodiment, the second protrusion 28 may have a height which is greater than the first protrusion 26. Consequently, in an assembled display device, the first protrusion 26 will not abut the first support plate 2, whereas the second protrusion 28 may abut the first support plate 2 (whether or not the third protrusion 38 is provided as a part of the first support plate 2). The space or gap between the first protrusion 26 and the first support plate 2 allows the sealing material to flow past the first protrusion during the assembly process. Even when the plates are abutting (i.e. when the second protrusion 28 is in contact with the first support plate 2), a gap may be present between the first protrusion 26 and the first support plate 2 to allow the sealing material to flow past the first protrusion 26. This ensures that the gap between the plates may be accurately controlled (as described above) by the heights of the protrusions, and may not be adversely affected by an excess application of sealing material 12.

As an alternative, the first and second protrusions 26 and 28 may be provided with the same height, and the third protrusion 38 may have a height selected such that the gap is provided between the first protrusion 26 and the first support plate 2.

Similar arrangements may be used for the third and fourth and sixth protrusions 32, 34 and 40.

While not shown in FIG. 5A, it will be understood that, as with FIG. 4A, the protrusions and the seal are provided fully around the outer edge of the second support plate 10 so as to enable the seal to fully seal the chamber containing the display region 8 in the assembled display device.

A further embodiment will now be described with reference to FIGS. 6A and 6B. Many features are shown which are in common with FIGS. 5A and 5B; these features will not be described in detail. As such, a seal 12 is surrounded by protrusions 26 and 28, and has protrusions 32 and 34 located on its inside. Protrusions 26 and 28 are spaced so as to define a channel, i.e. a groove, 30. Similarly, protrusions 32 and 34 are spaced and thus define a channel, i.e. a groove 36. FIG. 6B shows a cross-section taken along line G-G.

In addition to the features described above with reference to FIGS. 5A and 5B, transverse channels are provided across the protrusions 26, 28, 32 and 34. Many such transverse channels are shown in FIG. 6A, however, for clarity only two are labelled. Transverse channel 44 crosses first protrusion 26, and transverse channel 45 crosses protrusion 28. These transverse channels 44 and 45 improve the sealing efficiency by allowing a limited movement of the sealing material in the outward direction (i.e. in the direction of the flow of the second fluid) as represented by arrow 24 in FIG. 6B.

This limited flow prevents build-up of excess sealing material, while outward movement of the seal material is still partially constrained by the protrusion 26 such that the seal is effective. In some embodiments, as shown in FIG. 6A, the transverse channels 44 crossing the first protrusion 26 are offset with the transverse channels 45 crossing the second protrusion 28. In other words, any flow of sealing material through the transverse channels 44 in the first protrusion 26 into the channel 30 must travel lengthwise along the channel 30 before encountering a transverse channel 45 in the second protrusion 28. This ensures that a build-up of the sealing material may escape, but that the flow of the sealing material is hindered, to prevent excess loss of sealing material.

The transverse channels 44 and 45 may, for example, be 0.01 mm wide (in a direction parallel to the length of the protrusion). The spacing between adjacent channels along the length of the protrusion may be between 20 to 40 mm. The dimensions are dependent upon the photoresist materials used in photolithographic processing. Channels configured in this way provide the additional contribution of reducing the amount of stress generated in the support plate.

In this embodiment, the first protrusion may have a height equivalent to the second protrusion. Therefore, in the assembled display device, the first protrusion may abut the first support plate 2. This is possible because the transverse channels allow for excess sealing material to flow past the first protrusion, and therefore the lowered protrusion height, as described above with reference to FIGS. 5A and 5B, may not be required to prevent a build-up of excess sealing material.

Figure 6A:
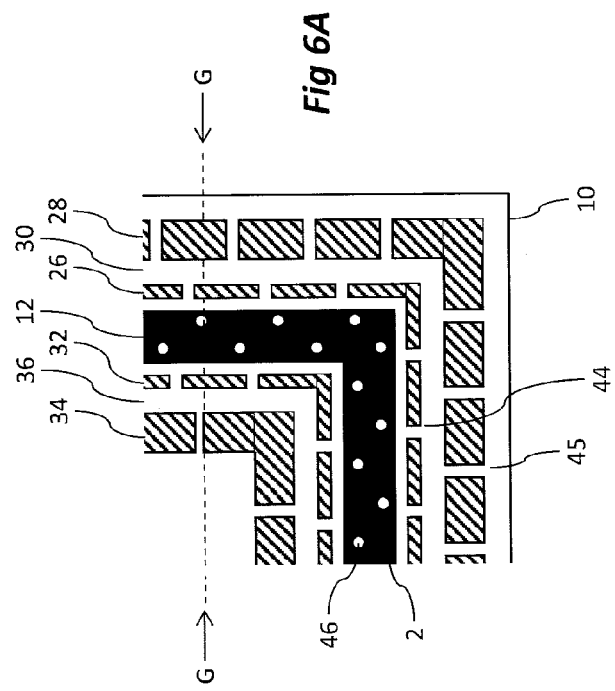
FIG. 6A shows a top view of part of a second support plate 10 according to an embodiment.
Figure 6B:
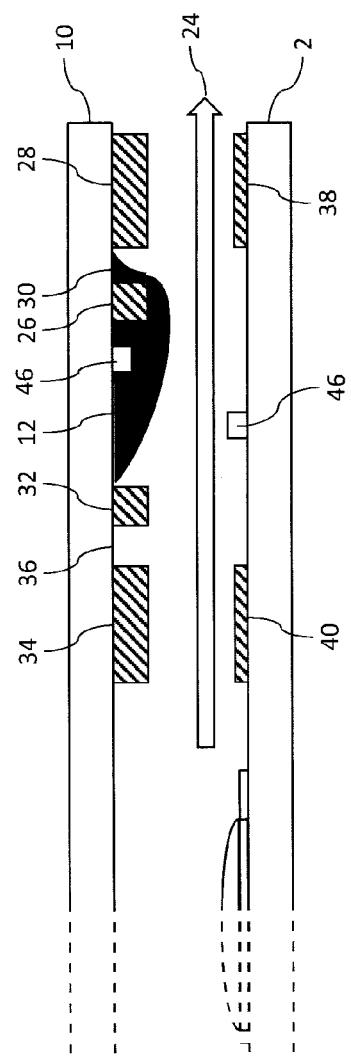
FIG. 6B shows a cross-section of the support plates 2 and 10 during assembly according to an embodiment.

A second addition to the embodiment shown in FIG. 6A is the inclusion of elements 46 extending from the second support plate into the seal. These elements 46 may be provided on the second support plate in a similar manner to the protrusions. Alternatively, or in addition, such elements may be provided on both support plates (as shown in FIG. 6B). The elements 46 improve the sealing performance in two ways. In a first instance the elements 46 constrain the outward movement of the seal, and therefore address, at least partially, the problem identified above of the outward movement of the seal impairing the sealing performance. In a second instance, the elements 46 improve the mechanical bond between the support plates provided by the seal, at least in part by increasing the effective surface area for the seal to bond with the support plates 2 and 10. The elements 46 may, in addition, be formed of a material which has a high affinity for the sealing material. Furthermore, the elements 46 may themselves at least partially constrain any outward movement of the sealing material.

The elements 46 may be provided on a staggered, periodic, basis as shown, however any appropriate arrangement, including a random distribution, may be used. In one example, the elements 46 may have a circular cross-section with a diameter of 0.1 mm, and a spacing between elements of 0.3 mm, however any appropriate size and shape may be used. In some embodiments, an exclusion zone along the centre of the channel containing the seal may be provided. This exclusion zone will not contain any elements, and may have a width in the region of 0.3 mm.

FIGS. 7A and 7B show a yet further embodiment, where FIG. 7A shows a plan view and FIG. 7B shows a cross-section taken along line H-H. Like the embodiments in FIGS. 5 and 6, a plurality of protrusions are located on both the inside and the outside of the seal. In this embodiment, there are more than two protrusions 41 on both the inside and outside of the seal 12, each of the protrusions 41 being spaced from an adjacent protrusion by a channel or groove 43. As with the embodiment of FIG. 6, there are transverse channels 47 across the protrusions 41. Many such transverse channels are shown in FIG. 7A, however, for clarity only one is labelled. Similar as for FIGS. 6A and 6B above, the transverse channels 47 improve the sealing efficiency by allowing a limited movement of the sealing material in the outward direction (i.e. in the direction of the flow of the second fluid) as represented by arrow 24 in FIG. 7B. As with FIG. 6, at least one of the transverse channels 47 in one protrusion are offset from at least one of the transverse channels in an adjacent protrusion.

In this embodiment, four protrusions are shown on the inside of the seal 12, and seven protrusions on the outside of the seal 12. It will be apparent that any number may be provided. In some embodiments, between 5 and 30 protrusions may be present on the inside of the seal 12, for example 16. Between 30 and 150 protrusions may be used on the outside of the seal, for example 92.

Each of the protrusions may be between 10 and 30 µm in width (width being measured in the plane of the second support plate 10 and perpendicularly traversing the protrusions 41), and may for example be about 16 µm. Similarly, the spacing between the transverse channels of a protrusion may be between 30 and 150 µm (measured in the plane of the second support plate 10 and parallel to the long axis of a protrusion, i.e. perpendicular to the width of the protrusion), and may for example be about 88 µm. Both the channels between the protrusions, and the transverse channels crossing the protrusions may be between 5 and 15 µm in width, and may, for example, be 8 µm (where the width of a channel is measured in the plane of the second support plate 10, and in the direction traversing the protrusions, and the width of a transverse channel is in the plane of the support plate, and is parallel to the long axis of the protrusions).

Figure 8:
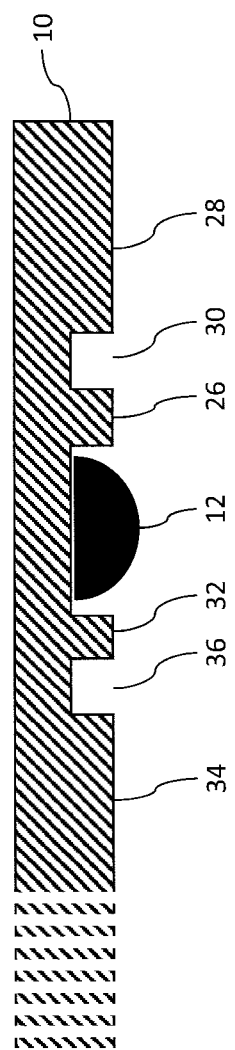
FIG. 8 shows a cross section of a second support plate 10 according to an embodiment.

In the embodiments shown in FIGS. 4 to 7 the protrusions may be formed on the second support plate 10 using an etching process. The material used to make the protrusions may be the same photoresist layer material, for instance SU-8, used for the second area 6. In the embodiments shown, the protrusions may be formed on underlying surfaces of the support plates. However this may not be the case. Therefore, as shown in FIG. 8, the protrusions 26 and 28 may be formed by etching channels 30 and 36 into the support plates such as support plate 10, as well as a further channel to receive the sealing material 12 before bringing the plates together. It will be apparent that the effect of such a construction is similar to that described above, i.e. that the protrusions are formed as the sides of etched channels.

A further embodiment will now be described with reference to FIG. 9. In this embodiment, instead of a protrusion (such as protrusion 26), a treated area 48 is provided outside the seal 12. In FIG. 9A this treated area is shown as hatched area 48 surrounding the seal 12. Furthermore, as shown in FIG. 9B (which is a cross-section taken along the line H-H in FIG. 9A), the treated area 48 at least partly constrains outward movement of the seal 12.

This treated area 48 may be formed by, for example, roughening the surface of the second support plate 10. This effect may be obtained by etching the surface of the second support plate 10, or by mechanically removing portions of the second support plate 10. As an alternative, an ozone treatment may be applied to the second support plate 10. In some embodiments, the area 48 may be repellent to the seal material.

Figure 10:
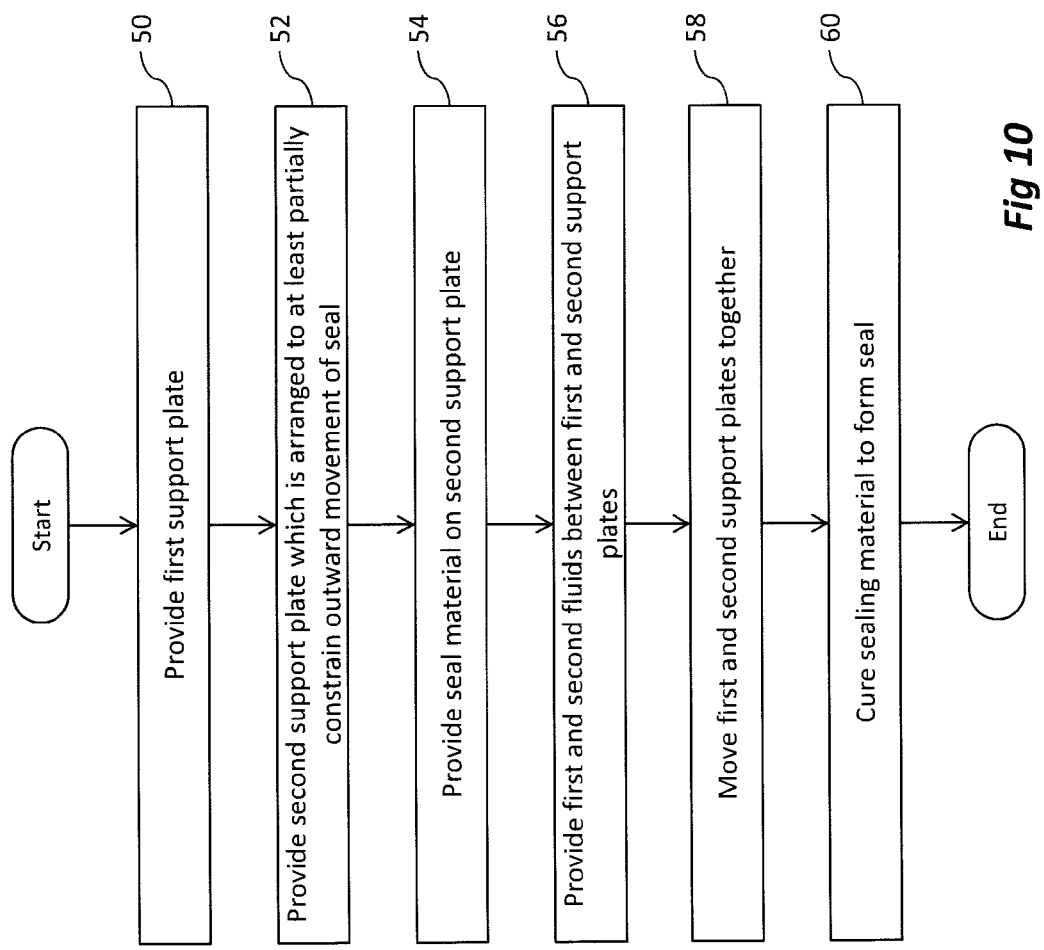
FIG. 10 shows a method of assembling a display device according to an embodiment.

A generalised method of constructing a display device according to an embodiment will now be described with reference to FIG. 10. The method below may be used to construct a display device according to any of the above-described embodiments.

In a first step 50, the first support plate 2 is provided. This step may include providing the first support plate 2 with the first surface areas 4 that are less wettable to the second fluid and a second surface area 6 more wettable to the second fluid as described above with reference to FIGS. 1A to 2B. In some embodiments (and if applicable), this step may also include providing the first support plate 2 with third and sixth protrusions 38 and 40.

In addition, in step 52, the second support plate 10 is provided. This second support plate is, as described above, arranged to at least partially constrain outward movement of the seal. This may be done by providing the second support plate with the protrusions or treated area as described above. It will be recognised that the steps 50 and 52 may occur in any order or concurrently.

In step 54, the seal is provided in position on the second support plate 10. The seal may be applied, for example, by being injected onto the support plate 10 in accordance with methods known in the art. The seal material 12 is located in accordance with the embodiments described above (for example, inside the first protrusion 26 or treated area 48 and, if applicable, outside any fourth protrusion 32).

In a subsequent step 56 the first and second fluids are provided between first and second support plates. As described above with reference to FIGS. 1A to 2B, this may be done by submerging the support plates in a bath of second fluid. The first fluid may be applied to the first support plate 2 as described above.

In step 58, the first and second support plates are moved together such that the seal on the second support plate 10 contacts the first support plate 2. As described above, during this step, some of the second fluid in the bath will be forced outwards from between the support plates. However, as also described above, the second support plate 10 constrains any induced outward movement of the seal caused by the flow of the second fluid.

Finally, in step 60, the seal 12 is cured to bond the two support plates 2 and 10 together and seal the chamber with the first and second fluids trapped therein.

In the above embodiments, the first and second areas 4 and 6, the protrusions 26, 28, 32, 34, 38 and 40, and/or the treated area 48 may all be provided by one or a combination of ablative (i.e. subtractive) processes, such as etching or the like, and/or an additive process such as layer deposition. In addition, the seal may be formed from a liquid sealant injected onto the second support plate and cured by UV radiation; however other sealants may be used, such as a pressure sensitive adhesive or a two-part adhesive.

The above embodiments are to be understood as illustrative examples. Further embodiments are envisaged. For instance, either of the double protrusion arrangements (i.e. with the first and second protrusions 26 and 28) described in FIGS. 5A and 5B and 6A and 6B may be used without the further protrusions (fourth and fifth protrusions 32 and 34). Further, either of the plurality of protrusion arrangements comprising protrusions 41 described in FIGS. 7A and 7B may be used; for example, a plurality of protrusions 41 may be used on the inside of the seal 12 without a plurality of protrusions 41 on the outside of the seal, or vice versa.

In one embodiment, the elements 46 may be sufficient to adequately constrain the outward movement of the seal, meaning that the protrusion 26 and/or the treated area 48 are not required. In this embodiment, the second support plate 10, having the elements 46 is sufficient to at least partly constrain the movement of the seal.

In some embodiments, the elements 46 may be provided on the second support plate along with any arrangement of the protrusions 26, 28, 32, 34, 38 and 40, 41 and/or the treated area 48; that is, with the arrangements shown in FIG. 4, 5, 6, 7, 8 or 9.

In other embodiments, only one or some of the protrusions may be provided with the transverse channels 44 as shown in FIG. 6A. For instance the channels 44 may be provided only in the first protrusion 26 and not in the second protrusion 28.

In further embodiments, the seal may be provided onto the first support plate (i.e. the plate on which the display region is provided), and accordingly the first support plate may be configured to constrain the outward movement of the seal, e.g. by being provided with protrusions.

In one embodiment, the protrusions 38 and 40 may be replaced by a single protrusion extending across the first support plate between the positions of the protrusions currently shown in FIGS. 5B and 6B.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An electrowetting display device comprising:
    a first support plate;
    a second support plate; and
    a seal arranged to bond the first support plate and the second support plate together, thereby providing a perimeter of a sealed chamber between the first support plate and the second support plate, the sealed chamber comprising a first fluid and a second fluid immiscible with the first fluid, the second support plate having a surface in contact with at least the second fluid, the second support plate comprising a first protrusion at least partly surrounding the seal to at least partly constrain outward movement of the seal, which outward movement is in an outwards direction away from a centre of the surface, the first protrusion comprising a first protrusion transverse channel crossing the first protrusion in a direction parallel to a plane of the second support plate.

2. The electrowetting display device of claim 1, wherein the second support plate comprises a second protrusion spaced from and surrounding the first protrusion.

3. The electrowetting display device of claim 2, wherein the first protrusion has a thickness in a direction parallel to the plane of the second support plate which is less than a thickness of the second protrusion in the direction parallel to the plane of the second support plate.

4. The electrowetting display device of claim 2, wherein the second protrusion has a height in a direction perpendicular to the plane of the second support plate which determines a spacing between the first support plate and the second support plate.

5. The electrowetting display device of claim 2, wherein the first support plate comprises a third protrusion arranged to abut the second protrusion.

6. The electrowetting display device of claim 5, wherein the second protrusion and the third protrusion each have a respective height in a direction perpendicular to the plane of the second support plate and the first support plate, respectively, which respective heights of the second protrusion and the third protrusion together determine a spacing between the first support plate and the second support plate.

7. The electrowetting display device of claim 1, wherein the first protrusion is spaced from the first support plate to form a gap therebetween.

8. The electrowetting display device of claim 1, wherein the second support plate comprises a second protrusion spaced from and at least partly surrounding the first protrusion, the second protrusion having a second protrusion transverse channel crossing the second protrusion in a direction parallel to the plane of the second support plate, the second protrusion transverse channel being offset, in a direction substantially parallel to a longitudinal axis of the first protrusion, from the first protrusion transverse channel.

9. The electrowetting display device of claim 1, wherein the second support plate comprises a plurality of protrusions surrounding the seal, the plurality of protrusions comprising the first protrusion, each protrusion of the plurality of protrusions being spaced from a respective adjacent protrusion of the plurality of protrusions.

10. The electrowetting display device of claim 9, wherein the first protrusion comprises a plurality of first protrusion transverse channels crossing the first protrusion in a direction parallel to the plane of the second support plate, the plurality of first protrusion transverse channels comprising the first protrusion transverse channel, and a second protrusion of the plurality of protrusions comprises a plurality of second protrusion transverse channels crossing the second protrusion in a direction parallel to the plane of the second support plate, wherein the first protrusion transverse channel of the plurality of first protrusion transverse channels is offset, in a direction substantially parallel to a longitudinal axis of the first protrusion, from a second protrusion transverse channel of the plurality of second protrusion transverse channels.

11. The electrowetting display device of claim 1, wherein the second support plate comprises one or more further protrusions surrounded by the seal.

12. The electrowetting display device of claim 1, wherein the second support plate comprises a plurality of seal surrounded protrusions surrounded by the seal, a first seal surrounded protrusion of the plurality of seal surrounded protrusions comprising a plurality of first seal surrounded protrusion transverse channels crossing the first seal surrounded protrusion in a direction parallel to the plane of the second support plate, and a second seal surrounded protrusion of the plurality of seal surrounded protrusions comprising a plurality of second seal surrounded protrusion transverse channels crossing the second seal surrounded protrusion in a direction parallel to the plane of the second support plate, the first seal surrounded protrusion being adjacent the second seal surrounded protrusion, wherein a first transverse channel of the plurality of first seal surrounded protrusion transverse channels is offset, in a direction substantially parallel to a longitudinal axis of the first seal surrounded protrusion, from a second transverse channel of the plurality of second seal surrounded protrusion transverse channels.

13. The electrowetting display device of claim 1, wherein the first protrusion is a substantially continuous protrusion surrounding a perimeter of the seal.

14. The electrowetting display device of claim 1, wherein the first protrusion has a height in a direction substantially perpendicular to the plane of the second support plate, configured for the seal to have partially overflowed the first protrusion.

15. The electrowetting display device of claim 2, wherein a ratio of a width of the first protrusion to a width of the second protrusion, the widths each being taken in a direction parallel to the plane of the second support plate and substantially perpendicularly traversing respectively the first protrusion and the second protrusion, is one or more of: approximately 1:8, or between 1:2 and 1:20.

16. The electrowetting display device of claim 1, wherein the second support plate comprises a treated area substantially surrounding the seal, the treated area being one or more of: a roughened area, or an area which is repellent to the seal.

17. A method of manufacturing an electrowetting display device, the method comprising:

providing a second support plate comprising a first protrusion to at least partly constrain outward movement of a seal material provided thereon, which outward movement is in an outwards direction away from a centre of a surface of the second support plate, the first protrusion comprising a first protrusion transverse channel crossing the first protrusion in a direction parallel to a plane of the second support plate;

providing the seal material in a position on the second support plate so as to be at least partly surrounded by the first protrusion;

providing a first fluid and a second fluid immiscible with the first fluid between the second support plate and a first support plate; and moving the first support plate and the second support plate together such that the seal material forms a seal between the first support plate and the second support plate.

18. The method according to claim 17, comprising, before the providing the second support plate:

manufacturing the second support plate, the manufacturing the second support plate comprising processing a substrate to form the first protrusion.

19. The method according to claim 18, wherein the processing the substrate to form the first protrusion comprises one or more of: an ablative process, a subtractive process, an etching process, a layer deposition process or an additive process.

20. The method according to claim 17, the providing the seal material in the position on the second support plate comprising injecting the seal material onto the surface of the second support plate.

21. The electrowetting display device according to claim 1, wherein at least one of the first support plate or the second support plate comprises a plurality of elements extending into and adhered to the seal.

22. The method according to claim 17, comprising, before the providing the second support plate:

manufacturing the second support plate, the manufacturing the second support plate comprising processing a substrate to form the first protrusion and a second protrusion spaced from and surrounding the first protrusion.

23. The method according to claim 17, comprising, before the providing the second support plate:

manufacturing the second support plate, the manufacturing the second support plate comprising processing a substrate to form the first protrusion and a second protrusion spaced from and at least partly surrounding the first protrusion, the second protrusion having a second protrusion transverse channel crossing the second protrusion in a direction parallel to the plane of the second support plate, the second protrusion transverse channel being offset, in a direction substantially parallel to a longitudinal axis of the first protrusion, from the first protrusion transverse channel.

* * * * *